(12) United States Patent
Lee et al.

(10) Patent No.: US 11,936,314 B2
(45) Date of Patent: Mar. 19, 2024

(54) MOTOR DRIVE DEVICE

(71) Applicants: Hyundai Motor Company, Seoul (KR); Kia Corporation, Seoul (KR)

(72) Inventors: Yong Jae Lee, Yongin-si (KR); Jung Hwi Kim, Seoul (KR); Jun Mo An, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/861,489

(22) Filed: Jul. 11, 2022

(65) Prior Publication Data

US 2023/0170830 A1    Jun. 1, 2023

(30) Foreign Application Priority Data

Nov. 26, 2021  (KR) .................. 10-2021-0165862

(51) Int. Cl.
| | | |
|---|---|---|
| *H02P 23/00* | (2016.01) | |
| *H02P 21/22* | (2016.01) | |
| *H02P 25/00* | (2006.01) | |
| *H02P 27/00* | (2006.01) | |
| *H02P 27/08* | (2006.01) | |

(52) U.S. Cl.
CPC ............. *H02P 21/22* (2016.02); *H02P 27/08* (2013.01)

(58) Field of Classification Search
CPC ................................ H02P 21/22; H02P 27/08
USPC ......................................................... 318/811
See application file for complete search history.

(56) References Cited

U.S. PATENT DOCUMENTS

| | | |
|---|---|---|
| 2009/0033253 A1 | 2/2009 | Nagashima et al. |
| 2017/0104423 A1 | 4/2017 | Wu et al. |
| 2018/0152127 A1* | 5/2018 | Park ................... H02P 27/12 |
| 2019/0296568 A1* | 9/2019 | Matsubara ............ H02J 7/1423 |
| 2019/0296665 A1* | 9/2019 | Matsubara ............... H02P 6/12 |
| 2020/0195100 A1* | 6/2020 | Omata .................... H02P 27/06 |

(Continued)

FOREIGN PATENT DOCUMENTS

| | | |
|---|---|---|
| EP | 3 651 351 A1 | 5/2020 |
| EP | 3 706 309 A1 | 9/2020 |
| JP | 6285256 B2 | 2/2018 |

OTHER PUBLICATIONS

Extended European Search Report dated Jan. 3, 2023, issued in corresponding European Patent Application No. 22185597.6.

*Primary Examiner* — Erick D Glass
(74) *Attorney, Agent, or Firm* — Morgan, Lewis & Bockius LLP

(57) ABSTRACT

A motor drive device is proposed. The motor drive device is configured to drive a motor having a plurality of windings respectively corresponding to a plurality of phases, and includes: a first inverter including a plurality of first switching elements, and connected to a first end of each of the plurality of windings; a second inverter including a plurality of second switching elements, and connected to a second end of each of the plurality of windings; and a controller configured to generate phase voltage commands of the first inverter and phase voltage commands of the second inverter based on preset voltage commands of the motor so that the phase voltage commands of the first inverter and the phase voltage commands of the second inverter are respectively represented as vectors of different angles.

10 Claims, 12 Drawing Sheets

(56) References Cited

U.S. PATENT DOCUMENTS

2020/0220488 A1* 7/2020 Mori ................... H02M 7/5387
2021/0297006 A1   9/2021 Takahashi et al.

* cited by examiner

- RELATED ART -

[synthesized voltage vector]

[first inverter voltage vector]

[second inverter voltage vector]

- RELATED ART -

[synthesized voltage vector]

[first inverter voltage vector]

[second inverter voltage vector]

MOTOR DRIVE DEVICE

CROSS REFERENCE TO RELATED APPLICATION

The present application claims the benefit of priority to Korean Patent Application No. 10-2021-0165862, filed on Nov. 26, 2021 in the Korean Intellectual Property Office, the entire contents of which is incorporated herein by reference.

TECHNICAL FIELD

The present disclosure relates to a motor drive device and, more particularly, to a motor drive device in an open-end winding method in which inverters are respectively connected to opposite ends of windings of a motor.

BACKGROUND

In general, windings of each phase included in a motor have one ends thereof connected to one inverter and the other ends thereof connected to each other, so as to form a Y-connection.

When the motor is driven, switching elements in the inverter are turned on/off by pulse width modulation control, and line voltages are applied to the windings of the motor having the Y-connection, so as to generate an alternating current, thereby generating a torque.

Fuel efficiency (or energy efficiency) of an eco-friendly vehicle such as an electric vehicle that uses torques generated by a motor as power is determined by power conversion efficiency of an inverter-motor, so it is important to maximize the power conversion efficiency of inverters and the efficiency of the motor in order to improve the fuel efficiency.

The efficiency of an inverter-motor system is mainly determined by a voltage utilization rate of an inverter. When an operating point of a vehicle determined by a relationship between a motor speed and a torque is formed in a section where the voltage utilization rate is high, the fuel efficiency of the vehicle may be improved.

However, as the number of windings of a motor is increased in order to increase the maximum torque of the motor, the section having the high voltage utilization rate moves away from a low torque region, which is a main operating point of a vehicle, and thus there may occur a problem in that fuel efficiency may be deteriorated. In addition, from the viewpoint of the fuel efficiency, when the main operating point is designed to be included in the section having the high voltage utilization rate, since there is a limitation in the maximum torque of the motor, there may occur a problem that acceleration start performance of the vehicle is deteriorated.

In order to solve such problems, in the related art, a motor drive technique in the open-end winding (OEW) method has been proposed, wherein two inverters are driven by way of respectively connecting the two inverters to opposite ends of windings of a motor instead of shorting one ends of the windings of the motor through the Y-connection.

Compared to the method of driving the conventional motor having a Y-connection structure, such a motor drive technique in the open-end winding method has an advantage that the voltage utilization rate may be enhanced and high power may be output by increasing phase voltages.

However, when a general direct current (DC) power is applied to the inverters respectively connected to the opposite ends of the windings of the motor, the motor drive technique in the open-end winding method is unable to control a zero phase component voltage to become zero on an average inverter switching periods, so a common mode current may be generated. The common mode current causes loss such as copper loss and iron loss while flowing through the windings of the motor, reducing motor efficiency, and in serious cases, burnout damage to a motor system may occur.

The foregoing is intended merely to aid in the understanding of the background of the present disclosure, and is not intended to mean that the present disclosure falls within the purview of the related art that is already known to those skilled in the art.

SUMMARY

According to one aspect of the present disclosure is to provide a motor drive device for solving technical problems, wherein, when driving a motor in the open-end winding method in which the inverters are respectively connected to opposite ends of windings of the motor, a common mode voltage between two inverters may be set to be the same, so as to control zero phase component voltages as desired, thereby removing circulating currents caused by a voltage difference and improving the efficiency of the motor.

In particular, according to another aspect of the present disclosure is to provide a motor drive device for solving the technical problems, wherein, when driving a motor in the open-end winding method in which inverters are respectively connected to opposite ends of windings of a motor, two inverters are allowed to instantaneously have the same zero phase component voltage, so that a difference between the zero phase component voltages of the two inverters may be made instantaneously to become zero.

In the present disclosure as a means for solving the above technical problems, there is provided a motor drive device configured to drive a motor having a plurality of windings respectively corresponding to a plurality of phases, the motor drive device including: a first inverter including a plurality of first switching elements, and connected to a first end of each of the plurality of windings; a second inverter including a plurality of second switching elements, and connected to a second end of each of the plurality of windings; and a controller configured to generate phase voltage commands of the first inverter and phase voltage commands of the second inverter based on preset voltage commands of the motor so that the phase voltage commands of the first inverter and the phase voltage commands of the second inverter are respectively represented as vectors of different angles.

In an exemplary embodiment of the present disclosure, the controller may generate the phase voltage commands of the first inverter and the phase voltage commands of the second inverter based on the voltage commands of the motor, so that the phase voltage commands of the first inverter and the phase voltage commands of the second inverter may respectively become vectors each having the same magnitude and a difference of 120 angle degrees apart from each other.

In the exemplary embodiment of the present disclosure, the controller may include: a current command map configured to generate current commands based on preset demand output of the motor; a current control part configured to compare the generated current commands with a detected value of a current supplied to the motor and generate voltage commands of the motor in order to reduce a difference obtained by the comparison; a first duty generation part configured to generate voltage commands of the first inverter by multiplying each of the voltage commands of the motor by $1/\sqrt{3}$, and respectively convert the voltage commands of the first inverter into the phase voltage commands of the first inverter; and a second duty generation part configured to generate voltage commands of the second inverter by multiplying each of the voltage commands of the motor by $-1/\sqrt{3}$, and respectively convert the voltage commands of the second inverter into the phase voltage commands of the second inverter.

In the exemplary embodiment of the present disclosure, the first duty generation part may generate a d-axis component voltage command and a q-axis component voltage command of the first inverter by multiplying the d-axis component voltage command and the q-axis component voltage command among the voltage commands of the motor by $1/\sqrt{3}$, and the second duty generation part may generate a d-axis component voltage command and a q-axis component voltage command of the second inverter by multiplying the d-axis component voltage command and the q-axis component voltage command among the voltage commands of the motor by $-1/\sqrt{3}$.

In the exemplary embodiment of the present disclosure, the first duty generation part may generate the phase voltage commands of the first inverter by converting the voltage commands of the first inverter to precede a rotation angle of the motor by 30 degrees, and the second duty generation part may generate the phase voltage commands of the second inverter by converting the voltage commands of the second inverter to precede the rotation angle of the motor by 150 degrees.

In the exemplary embodiment of the present disclosure, the first duty generation part may generate the phase voltage commands of the first inverter by converting the voltage commands of the first inverter to follow a rotation angle of the motor by 30 degrees, and the second duty generation part may generate the phase voltage commands of the second inverter by converting the voltage commands of the second inverter to follow the rotation angle of the motor by 150 degrees.

In addition, the first duty generation part may generate the phase voltage commands of the first inverter by converting the voltage commands of the first inverter to precede a rotation angle of the motor by 150 degrees, and the second duty generation part may generate the phase voltage commands of the second inverter by converting the voltage commands of the second inverter to precede the rotation angle of the motor by 30 degrees.

In addition, the first duty generation part may generate the phase voltage commands of the first inverter by converting the voltage commands of the first inverter to follow a rotation angle of the motor by 150 degrees, and the second duty generation part may generate the phase voltage commands of the second inverter by converting the voltage commands of the second inverter to follow the rotation angle of the motor by 30 degrees.

In the exemplary embodiment of the present disclosure, the first duty generation part may generate zero phase component voltage commands of the first inverter by multiplying the zero phase component voltage commands among the voltage commands of the motor by $P_1$, and the second duty generation part may generate zero phase component voltage commands of the second inverter by multiplying the zero phase component voltage commands among the voltage commands of the motor by $-P_2$ (here, $P_1+P_2=1$).

In the exemplary embodiment of the present disclosure, the $P_1$ and $P_2$ may respectively have values different from each other.

According to the motor drive device, generation of the common mode current may be suppressed by controlling the zero phase component voltages of the two inverters applied to the open-end winding method as desired.

Therefore, according to the motor drive device, phase currents of a motor are prevented from being distorted by the common mode current, thereby facilitating the control of motor currents. In addition, the loss such as iron loss and copper loss of the motor caused by the circulating current is prevented from occurring, so that not only the driving efficiency of the motor may be significantly improved, but also burnout damage to the motor may be prevented in advance.

In particular, according to the motor drive device, when driving a motor in the open-end winding method, zero phase component voltages are instantaneously made to become zero, so that even a motor loss due to an instantaneous ripple of a zero phase component current (i.e., common mode current) may be removed.

The effects of the present disclosure are not limited to the above-mentioned effects, and other objectives that are not mentioned will be clearly understood by those skilled in the art from the following description.

DETAILED DESCRIPTION

Hereinafter, motor drive devices according to various exemplary embodiments of the present disclosure will be described in detail with reference to the accompanying drawings.

Figure 1:
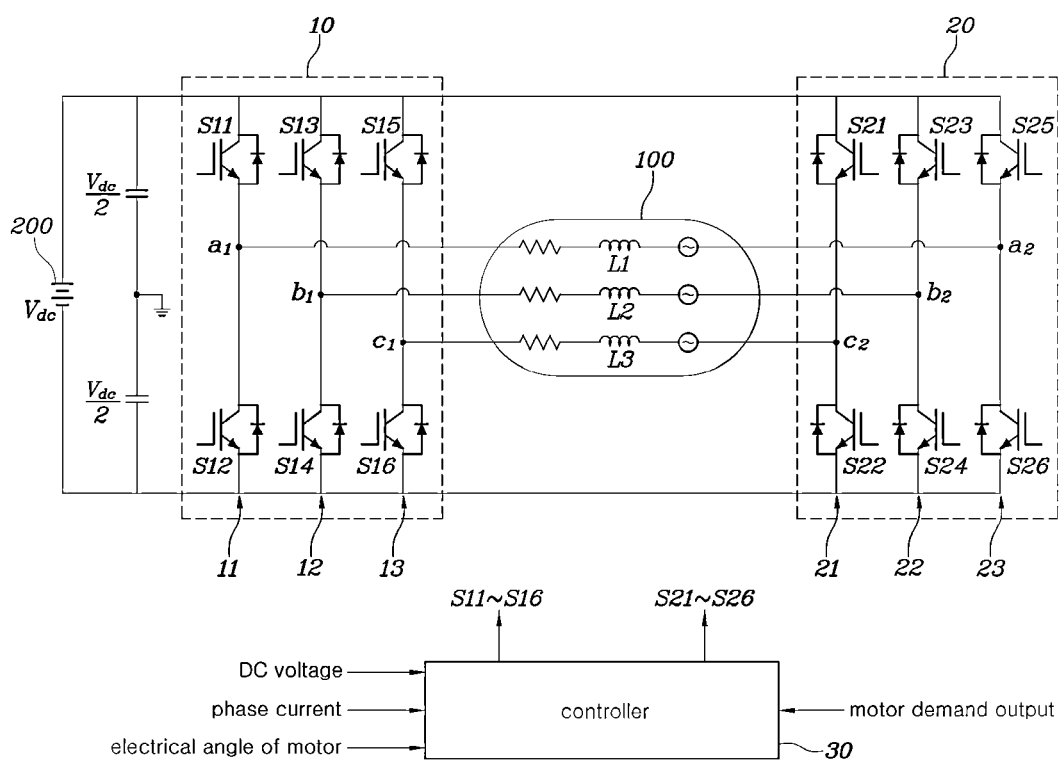
FIG. 1 is a circuit diagram of a motor drive device according to an exemplary embodiment of the present disclosure.

FIG. 1 is a circuit diagram of a motor drive device according to an exemplary embodiment of the present disclosure.

Referring to FIG. 1, the motor drive device according to the exemplary embodiment of the present disclosure is a motor drive device configured to supply driving power to a motor 100 having a plurality of windings L1 to L3 respectively corresponding to a plurality of phases, and may be configured to include: a first inverter 10 including a plurality of first switching elements S11 to S16 and connected to each first end of windings of the motor 100; a second inverter 10 including a plurality of second switching elements S21 to S26 and connected to each second end of the windings of the motor 100; and a controller 30 configured to control pulse width modulation of the first switching elements S11 to S16 and the second switching elements S21 to S26 based on a demand output of the motor 100.

The first inverter 10 and the second inverter 20 may convert DC power stored in a battery 200 into three-phase alternate current (AC) power and provide the AC power to the motor 100, or may convert regenerative braking energy generated by regenerative braking torque generation of the motor 100 during regenerative braking into DC current and provide the DC current to the battery 200. Such conversion between DC power and AC power may be performed by controlling the pulse width modulation of the plurality of first switching elements S11 to S16 provided in the first inverter 10 and the pulse width modulation of the plurality of second switching elements S21 to S26 provided in the second inverter 20.

The first inverter 10 may include a plurality of legs 11 to 13 to which a DC voltage generated in a DC link capacitor 300 connected to opposite ends of the battery 200 is applied. The legs 11 to 13 may respectively correspond to the plurality of phases of the motor 100 so that an electrical connection may be established.

More specifically, a first leg 11 includes two switching elements S11 and S12 connected in series to each other between opposite ends of the DC link capacitor 300, and a connection node of the two switching elements S11 and S12 may be connected to one end of a winding L1 of a phase in the motor 100 so that AC power corresponding to the phase among the plurality of phases is input or output.

Similarly, a second leg 12 includes two switching elements S13 and S14 connected in series to each other between the opposite ends of the DC link capacitor 300, and a connection node of the two switching elements S13 and S14 may be connected to one end of a winding L2 of a phase in the motor 100 so that AC power corresponding to the phase among the plurality of phases is input or output.

In addition, a third leg 13 includes two switching elements S15 and S16 connected in series to each other between the opposite ends of the DC link capacitor 300, and a connection node of the two switching elements S15 and S16 may be connected to one end of a winding L3 of a phase in the motor 100 so that AC power corresponding to the phase among the plurality of phases is input or output.

The second inverter 20 may also have a configuration similar to that of the first inverter 10. The second inverter 20 may include a plurality of legs 21 to 23 to which the DC voltage generated in the DC link capacitor 300 connected to the opposite ends of the battery 200 is applied. The legs 21 to 23 may respectively correspond to the plurality of phases of the motor 100 so that an electrical connection may be established.

More specifically, a first leg 21 includes two switching elements S21 and S22 connected in series to each other between the opposite ends of the DC capacitor 300, and a connection node of the two switching elements S21 and S22 may be connected to the other end of a winding L1 of a phase in the motor 100 so that AC power corresponding to the phase among the plurality of phases is input or output.

Similarly, a second leg 22 includes two switching elements S23 and S24 connected in series to each other between the opposite ends of the DC capacitor 300, and a connection node of the two switching elements S23 and S24 may be connected to the other end of a winding L2 of a phase in the motor 100 so that AC power corresponding to the phase among the plurality of phases is input or output.

In addition, a third leg 23 includes two switching elements S25 and S26 connected in series to each other between the opposite ends of the DC capacitor 300, and a connection node of the two switching elements S25 and S26 may be connected to the other end of a winding L3 of a phase in the motor 100 so that AC power corresponding to the phase among the plurality of phases is input or output.

The first inverter 10 is connected to one ends of the windings L1 to L3 of the motor 100 and the second inverter 20 is connected to the other ends of the windings L1 to L3 of the motor 100. That is, electrical connections in the open-end winding method may be established, wherein opposite ends of the windings L1 to L3 of the motor 100 are respectively connected to the first inverter 10 and the second inverter 20.

The controller 30 is fundamentally an element for controlling the pulse width modulation of the switching elements S11 to S16 included in the first inverter 10 and the pulse width modulation of the switching elements S21 to S21 included in the second inverter 20 so that the motor 100 may be driven based on a demand output required for the motor 100.

The controller 30 may drive the motor 100 by switching first switching elements S11 to S16 of the first inverter 10 and second switching elements S21 to S26 of the second inverter 20 in the pulse width modulation method, after receiving inputs including: DC voltage $V_{dc}$ applied to the first inverter 10 and the second inverter 20; a phase current provided to the motor 100 detected by a current sensor (not shown); and an electrical angle of the motor detected by a motor rotor sensor (not shown) installed in the motor 100. In particular, the controller 30 may apply the space vector pulse width modulation (SVPWM) method when controlling the first switching elements S11 to S16 of the first inverter 10 and the second switching elements S21 to S26 of the second inverter 20 in the pulse width modulation method.

In order to help a clearer understanding of the motor drive device according to the exemplary embodiment of the present disclosure having the above configuration, a control method of the conventional motor drive device in the open-end winding method will be first described.

Figure 2:
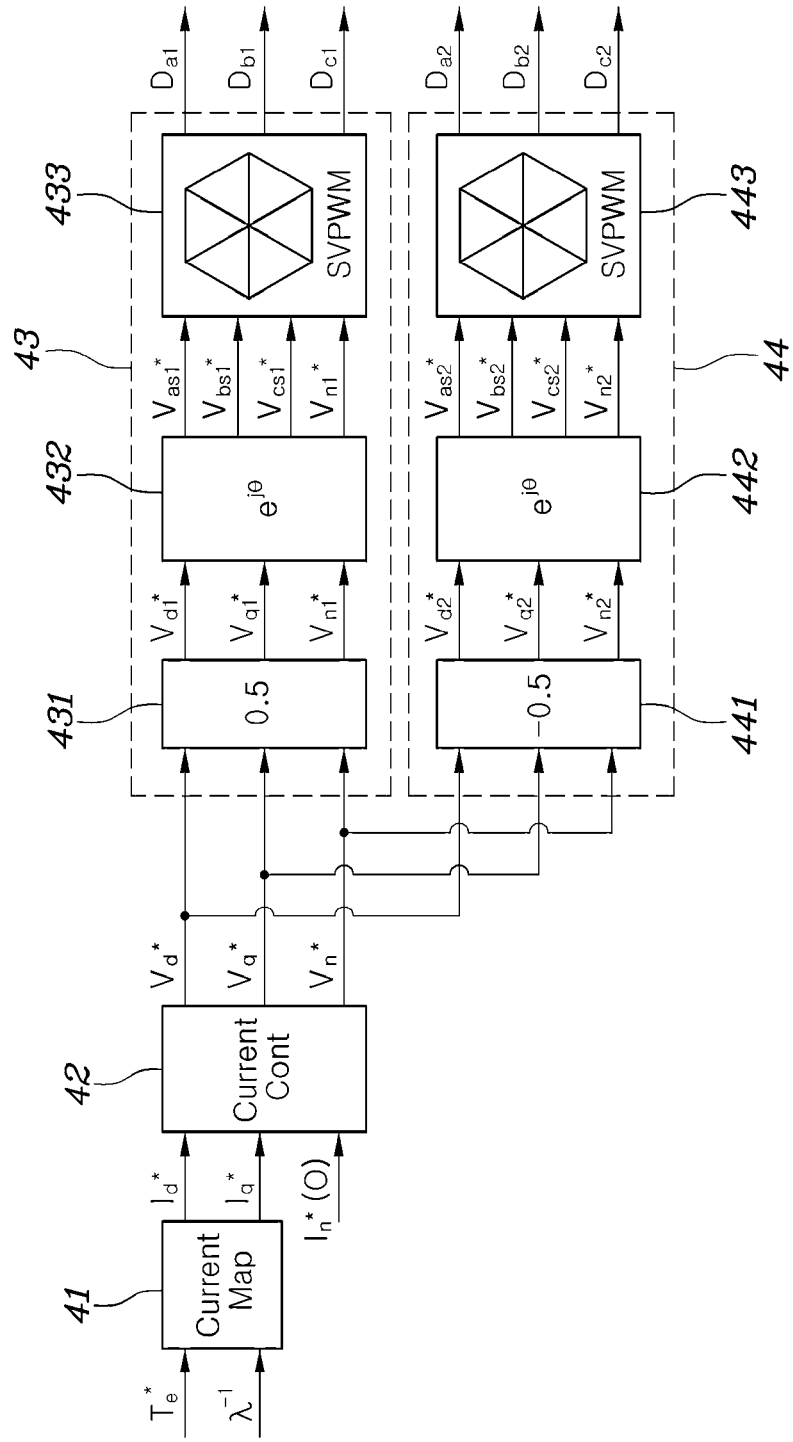
FIG. 2 is a block diagram illustrating in detail a conventional controller for controlling a motor in an open-end winding method.
Figure 3:
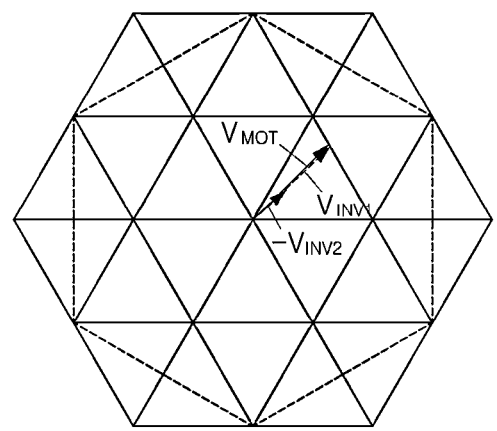
FIG. 3 is a voltage vector diagram for describing a motor control technique applied in the conventional controller shown in FIG. 2.
Figure 3:
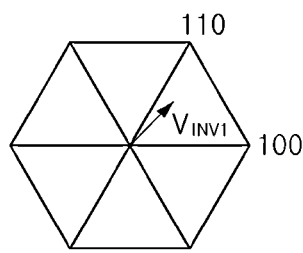
Figure 3:
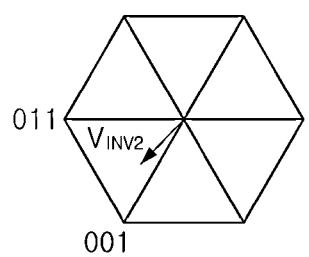
Figure 4:
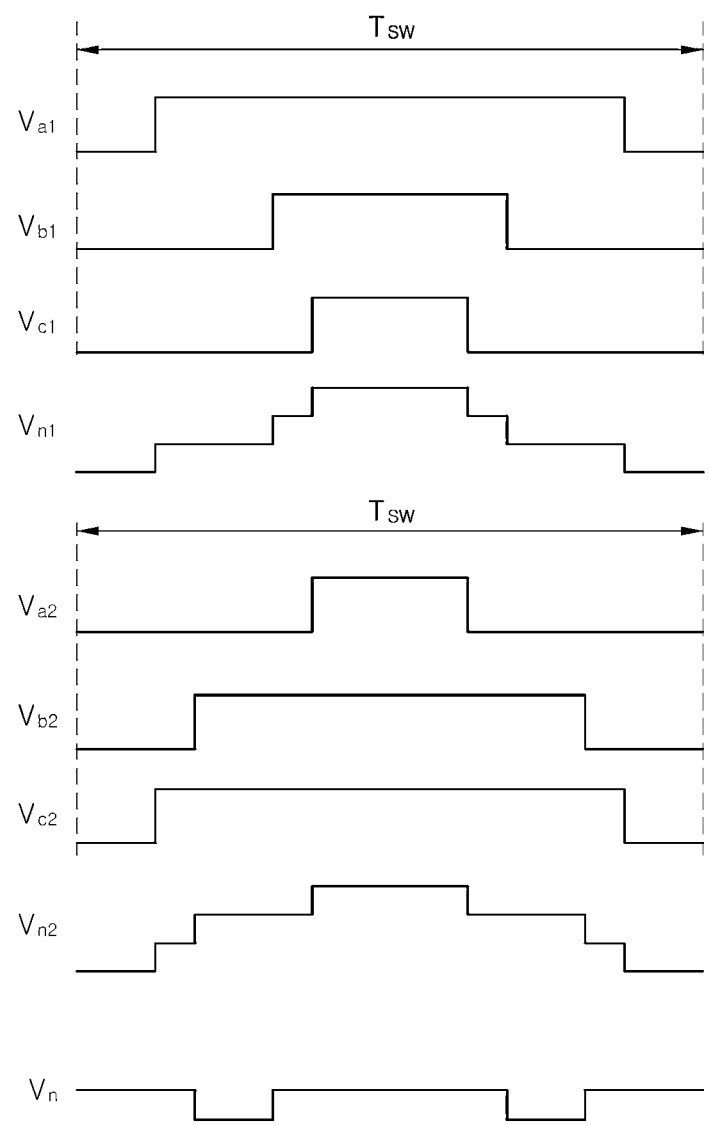
FIG. 4 is a waveform diagram illustrating voltage output of each inverter generated when the motor is controlled by the conventional controller shown in FIG. 2.
Figure 5:
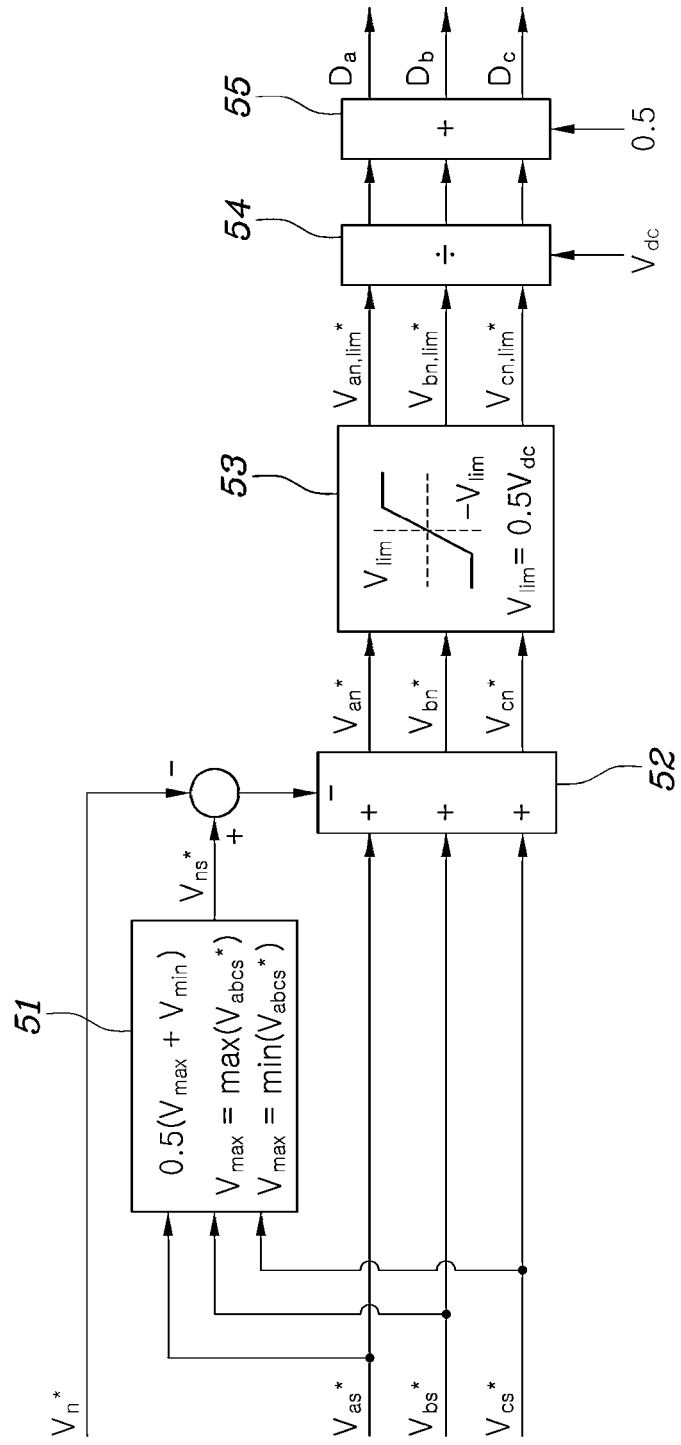
FIG. 5 is a block diagram illustrating in more detail a space vector modulation part in the conventional controller shown in FIG. 2.

FIG. 2 is a block diagram illustrating in detail a conventional controller for controlling a motor in the open-end winding method, and FIG. 3 is a voltage vector diagram for describing a motor control technique applied in the conventional controller shown in FIG. 2. In addition, FIG. 4 is a waveform diagram illustrating voltage output of each inverter generated when the motor is controlled by the conventional controller shown in FIG. 2, and FIG. 5 is a block diagram illustrating in more detail a space vector modulation part in the conventional controller shown in FIG. 2.

As shown in FIG. 2, the controller of the conventional motor drive device may include a current command map 41, a current controller 42, a first duty generation part 43, and a second duty generation part 44.

The current command map 41 may be based on a motor demand output (i.e., a motor demand torque $T_{e*}$) and motor back electromotive force $\lambda^{-1}$, which are generated by an operator's operation and the like, and may generate current commands $I_{d*}$ and $I_{q*}$ corresponding to the motor demand output. The current command map 41 generates a current command of the motor reflecting the motor demand output. In the example of FIG. 2, a map based on the motor demand output and back electromotive force is illustrated, but a map that generates the motor current command based on other factors may be applicable.

The current control part 42 may receive the current commands $I_{d*}$ and $I_{q*}$, and compare the same with a detected value of a current supplied to an actual motor, so that voltage commands $V_{d*}$, $V_{q*}$, and $V_{n*}$ capable of reducing a difference obtained by the comparison may be generated. The voltage command may include a d-axis component $V_{d*}$, a q-axis component $V_{q*}$, and a zero phase component $V_{n*}$.

The first duty generation part 43 is an element for generating duties of the switching elements in the first inverter 10 shown in FIG. 1, and may include: a multiplication part 431 configured to multiply the voltage commands $V_{d*}$, $V_{q*}$, and $V_{n*}$ by ½ so as to respectively generate first inverter voltage commands $V_{d1*}$, $V_{q1*}$, and $V_{n1*}$ for applying to the first inverter 10; a coordinate conversion part 432 configured to respectively convert the first inverter voltage commands $V_{d1*}$, $V_{q1*}$, and $V_{n1*}$ into first inverter phase voltage commands $V_{as1*}$, $V_{bs1*}$, and $V_{cs1*}$ corresponding to each phase of a motor; and a first space vector pulse width modulation part 433 configured to generate the duties of the switching elements in the first inverter 10 by performing space vector pulse width modulation based on the first inverter phase voltage commands $V_{as1*}$, $V_{bs1*}$, and $V_{cs1*}$ and the zero phase component $V_{n1*}$ of the first inverter voltage commands.

Similar to the first duty generation part 43, The second duty generation part 44 is an element for generating the duties of the switching elements in the second inverter 20 shown in FIG. 1, and may include: a multiplication part 441 configured to multiply the voltage commands $V_{d*}$, $V_{q*}$, and $V_{n*}$ by –½ so as to respectively generate second inverter voltage commands $V_{d2*}$, $V_{q2*}$, and $V_{n2*}$ for applying to the second inverter 20; a coordinate conversion part 442 configured to respectively convert the second inverter voltage commands $V_{d2*}$, $V_{q2*}$, and $V_{n2*}$ into second inverter phase voltage commands $V_{as2*}$, $V_{bs2*}$, and $V_{cs2*}$ corresponding to each phase of the motor; and a second space vector pulse width modulation part 443 configured to generate the duties of the switching elements in the second inverter 20 by performing the space vector pulse width modulation based on the second inverter phase voltage commands $V_{as2*}$, $V_{bs2*}$, and $V_{cs2*}$ and the zero phase component $V_{n2*}$ of the second inverter voltage commands.

Here, coordinate conversion by the coordinate conversion parts 432 and 442 corresponds to a technique known in the related art as transforming dq coordinates into abc coordinates corresponding to the three phases of the motor.

As shown in FIG. 2, the conventional motor control technique in the open-end winding method is used in a way in which the voltage commands of the motor is equally distributed to the first inverter 10 and the second inverter 20.

That is, as shown in FIG. 3, in the motor control of the open-end winding structure, a motor voltage $V_{MOT}$ shown on a vector diagram obtained by synthesizing a switching vector diagram for the first inverter 10 and a switching vector diagram for the second inverter 20 may be expressed in the form of a difference between a voltage $V_{INV1}$ generated by the first inverter 10 and a voltage $V_{INV2}$ generated by the second inverter 20 having the same magnitude and opposite direction as the voltage $V_{INV1}$ generated by the first inverter 10. Each vector diagram is shown on a dq plane, and the dq plane and each vector diagram for space vector pulse width modulation are well known in the related art, so a separate detailed description thereof will be omitted.

In this way, when the first inverter voltage and second inverter voltage having the same magnitude and having opposite directions are implemented through the space vector pulse width modulation, an inverter output voltage waveform as shown in FIG. 4 may be obtained. In FIG. 4, $T_{SW}$ is a switching period of the switching elements in the inverter. $V_{a1}$, $V_{b1}$, $V_{c1}$, and $V_{n1}$ respectively represent phase voltages and a zero phase component voltage of the first inverter 10. $V_{a2}$, $V_{b2}$, $V_{c2}$, and $V_{n2}$ respectively represent phase voltages and a zero phase component voltage of the second inverter 20. $V_n$ represents a difference between the zero phase component voltage of the first inverter 10 and the zero phase component voltage of the second inverter 20, whereby the zero phase component voltages applied to a motor by the first inverter and the second inverter are illustrated.

As shown in FIG. 4, the first inverter voltage and the second inverter voltage respectively have zero phase component voltages different from each other because the first inverter voltage and the second inverter voltage have different phases in spite of having the same voltage magnitude on the dq plane. Accordingly, the magnitude of the zero phase component voltage $V_n$ applied to a motor is unable to be maintained to zero on an average period.

As shown in FIG. 5, the space vector modulation part 433 or 443 in the conventional controller shown in FIG. 2 may include an offset voltage generation part 51, a pole voltage command generation part 52, a pole voltage command limit part 53, a division part 54, and a summation part 55.

The offset voltage generation part 51 generates an offset voltage command $V_{ns*}$ based on three-phase voltage commands $V_{as*}$, $V_{bs*}$, and $V_{cs*}$. The pole voltage command generation part 52 subtracts a value, obtained by subtracting the zero phase component voltage $V_{n*}$ from the said offset voltage command $V_{ns*}$, from the three-phase voltage commands $V_{as*}$, $V_{bs*}$, and $V_{cs*}$ so as to generate pole voltage commands $V_{an*}$, $V_{bn*}$, and $V_{cn*}$.

As described above, during the motor control in the conventional open-end winding method, the offset voltage command $V_{ns*}$ is generated based on the three-phase voltage commands $V_{as*}$, $V_{bs*}$, and $V_{cs*}$, so there occurs a difference between the offset voltage command $V_{ns*}$ and an offset voltage output from each inverter when the motor is actually driven with two inverters. In particular, since the first inverter 10 and the second inverter 20 generate the offset voltage commands $V_{ns*}$ different from each other, the offset voltage corresponding to the offset voltage command is not actually output from each inverter.

When this is expressed as an equation, the equation is as in Equation 1 below.

$$V_{ns1} = V_{n1*} - V_{ns1*} = 0.5V_{n*} - V_{ns1*}$$

$$V_{ns2} = V_{n2*} - V_{ns2*} = -0.5V_{n*} - V_{ns2*} \quad \text{[Equation 1]}$$

Accordingly, a zero phase component voltage that is finally applied to a motor becomes Equation 2 below, and thus the zero phase component voltage may not be controlled as desired.

$$V_{ns1} - V_{ns2} = V_{n*} - V_{ns1*} + V_{ns2*} \quad \text{[Equation 2]}$$

As described above, when the zero phase component voltage is not controlled to zero on the average period, a common mode current of the motor is generated, and the loss occurring in the motor increases due to the flow of the common mode current, and thus, in severe cases, burnout damage to the motor may occur.

In FIG. 5, the pole voltage command limit part 53 may limit the pole voltage commands to a range of ±0.5 of DC voltage $V_{DC}$ applied to the first inverter 10 and the second inverter 20, the division part 54 may divide each limited pole voltage command by the DC voltage $V_{DC}$ applied to the first inverter 10 and the second inverter 20, and the summation part 55 may determine the duties $D_a$, $D_b$, and $D_c$ of the switching elements in the inverters by adding 0.5 to respective division results of the division part 54.

Since the techniques of the pole voltage command limit part 53, the division part 54, and the summation part 55 correspond to well-known techniques applied to implement pulse width modulation control and also the detailed operation may be performable by those skilled in the art sufficiently, an additional detailed description thereof will be omitted.

Figure 6:
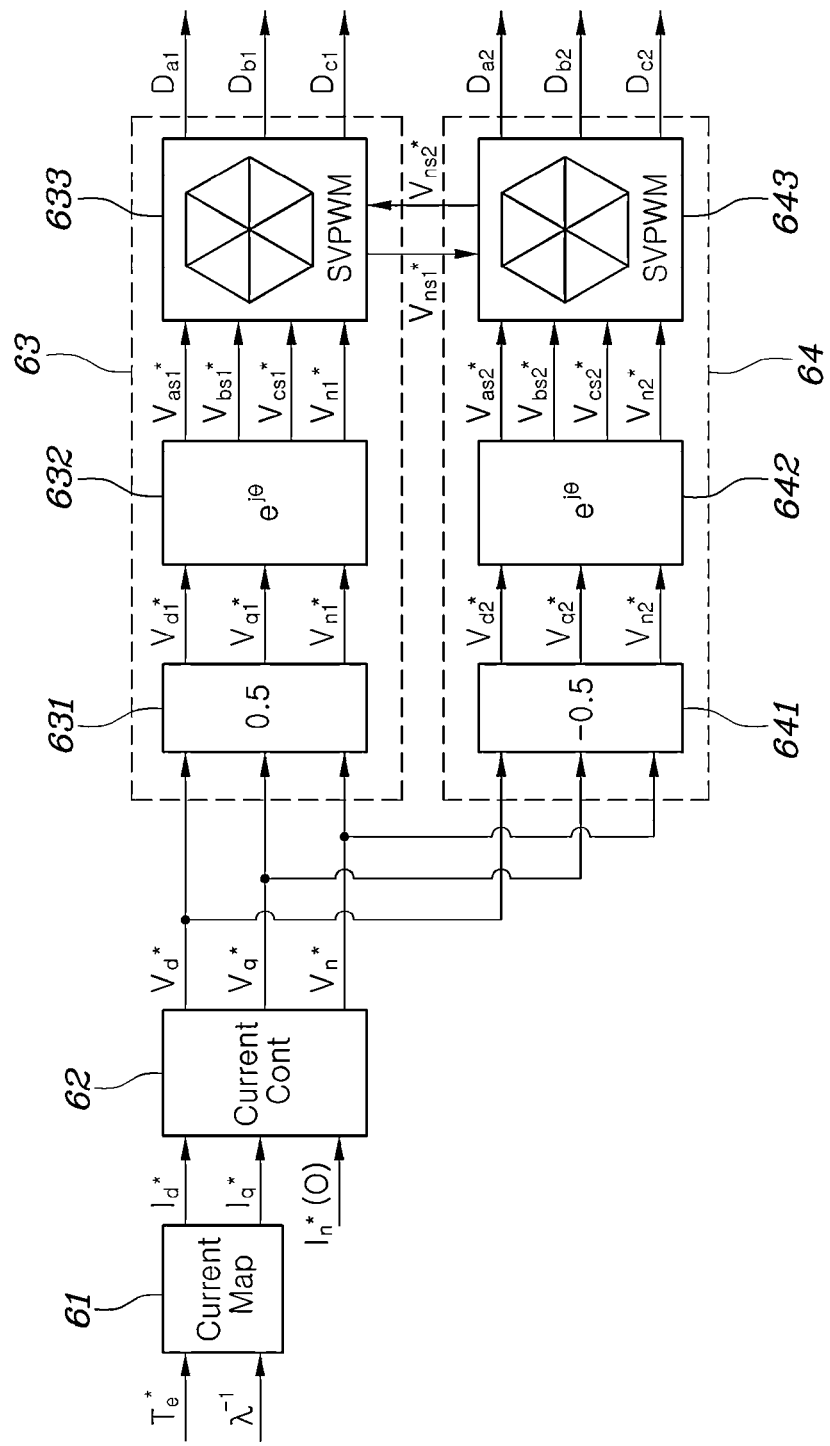
FIG. 6 is a block diagram illustrating in detail a controller applied to a motor drive device according to an exemplary embodiment of the present disclosure.

FIG. 6 is a block diagram illustrating in detail the controller applied to the motor drive device according to the exemplary embodiment of the present disclosure.

Referring to FIG. 6, the controller 30 applied to the motor drive device according to the exemplary embodiment of the present disclosure may include a processor (e.g., computer, microprocessor, CPU, ASIC, circuitry, logic circuits, etc.) and an associated non-transitory memory storing software instructions which, when executed by the processor, provides the functionalities of a current command map 61, a current control part 62, a first duty generation part 63, and a second duty generation part 64.

The current command map 61 may be based on a motor demand output (i.e., a motor demand torque $T_{e*}$) and motor back electromotive force $\lambda^{-1}$, which are generated by an operator's operation and the like, and may generate current commands $I_{d*}$ and $I_{q*}$ corresponding to the motor demand output.

The current control part 62 may receive the current commands $I_{d*}$ and $I_{q*}$ and compare the same with the detected value of the current supplied to the actual motor, so that voltage commands $V_{d*}$, $V_{q*}$, and $V_{n*}$ capable of reducing the difference obtained by the comparison may be generated. The voltage command may include a d-axis component $V_{d*}$, a q-axis component $V_{q*}$, and a zero phase component $V_{n*}$.

The current command map 61 and the current control part 62 may be substantially the same as those applied to the conventional motor control technique shown in FIG. 2.

The first duty generation part 63 is an element for generating the duties of the switching elements in the first inverter 10, and may include: a multiplication part 631 configured to generate first inverter voltage commands $V_{d1*}$, $V_{q1*}$, and $V_{n1*}$ for applying to the first inverter 10 by multiplying the voltage commands $V_{d*}$, $V_{q*}$, and $V_{n*}$ by ½; a coordinate conversion part 632 configured to respectively convert the first inverter voltage commands $V_{d1*}$, $V_{q1*}$, and $V_{n1*}$ into first inverter phase voltage commands $V_{as1*}$, $V_{bs1*}$, and $V_{cs1*}$ respectively corresponding to phases of a motor; and a first space vector pulse width modulation part 633 configured to generate duties $D_{a1}$, $D_{b1}$ and $D_{c1}$ of the respective switching elements in the first inverter 10 by performing space vector pulse width modulation based on a first offset voltage command $V_{ns1*}$ generated based on the first inverter phase voltage commands $V_{as1*}$, $V_{bs1*}$, and $V_{cs1*}$, the zero phase component $V_{n1*}$ of the first inverter voltage commands, and a second offset voltage command $V_{ns2*}$ generated in the second duty generation part 64.

Similar to the first duty generation part 63, the second duty generation part 64 is an element for generating the duties of the switching elements in the second inverter 20, and may include: a multiplication part 641 configured to generate second inverter voltage commands $V_{d2*}$, $V_{q2*}$, and $V_{n2*}$ for applying to the second inverter 20 by multiplying the voltage commands $V_{d*}$, $V_{q*}$, and $V_{n*}$ by -½; a coordinate conversion part 642 configured to respectively convert the second inverter voltage commands $V_{d2*}$, $V_{q2*}$, and $V_{n2*}$ into second inverter phase voltage commands $V_{as2*}$, $V_{bs2*}$, and $V_{cs2*}$ respectively corresponding to the phases of the motor; and a first space vector pulse width modulation part 643 configured to generate duties $D_{a2}$, $D_{b2}$, and $D_{c2}$ of the respective switching elements in the second inverter 20 by performing the space vector pulse width modulation based on a second offset voltage command $V_{ns2*}$ generated based on the second inverter phase voltage commands $V_{as2*}$, $V_{bs2*}$, and $V_{cs2*}$, the zero phase component $V_{n2*}$ of the second inverter voltage commands, and a first offset voltage command $V_{ns1*}$ generated in the first duty generation part 63.

In the exemplary embodiment of the present disclosure, it is characterized in that the first duty generating part 63 and the second duty generating part 64 mutually share each of the offset voltage commands respectively determined according to the output voltages of the first inverter 10 and the second inverter 20, so that both inverters are allowed to have the same zero phase component voltage. That is, the first duty generation part 63 for controlling the first inverter 10 may use the first inverter phase voltage commands $V_{as1*}$, $V_{bs1*}$, and $V_{cs1*}$ that are corresponding to the output voltages of the first inverter 10, so as to generate the first offset voltage command $V_{ns1*}$ and provide the same to the second duty generation part 64 thereafter, and the second duty generation part 64 for controlling the second inverter 20 may use the second inverter phase voltage commands $V_{as2*}$, $V_{bs2*}$, and $V_{cs2*}$ that are corresponding to the output voltages of the second inverter 20, so as to generate the second offset voltage command $V_{ns2*}$ and provide the same to the first duty generation part 63 thereafter.

The first duty generating part 63 and the second duty generating part 64 may respectively generate synthesized offset voltage commands having the same value by synthesizing the first offset voltage command $V_{ns1*}$ and the second offset voltage command $V_{ns2*}$ with each other, and may respectively generate pole voltage commands for the inverters by respectively applying the synthesized offset voltage commands and the zero phase component voltage commands $V_{n1*}$ and $V_{n2*}$ of each inverter to the phase voltage commands of each inverter.

Figure 7:
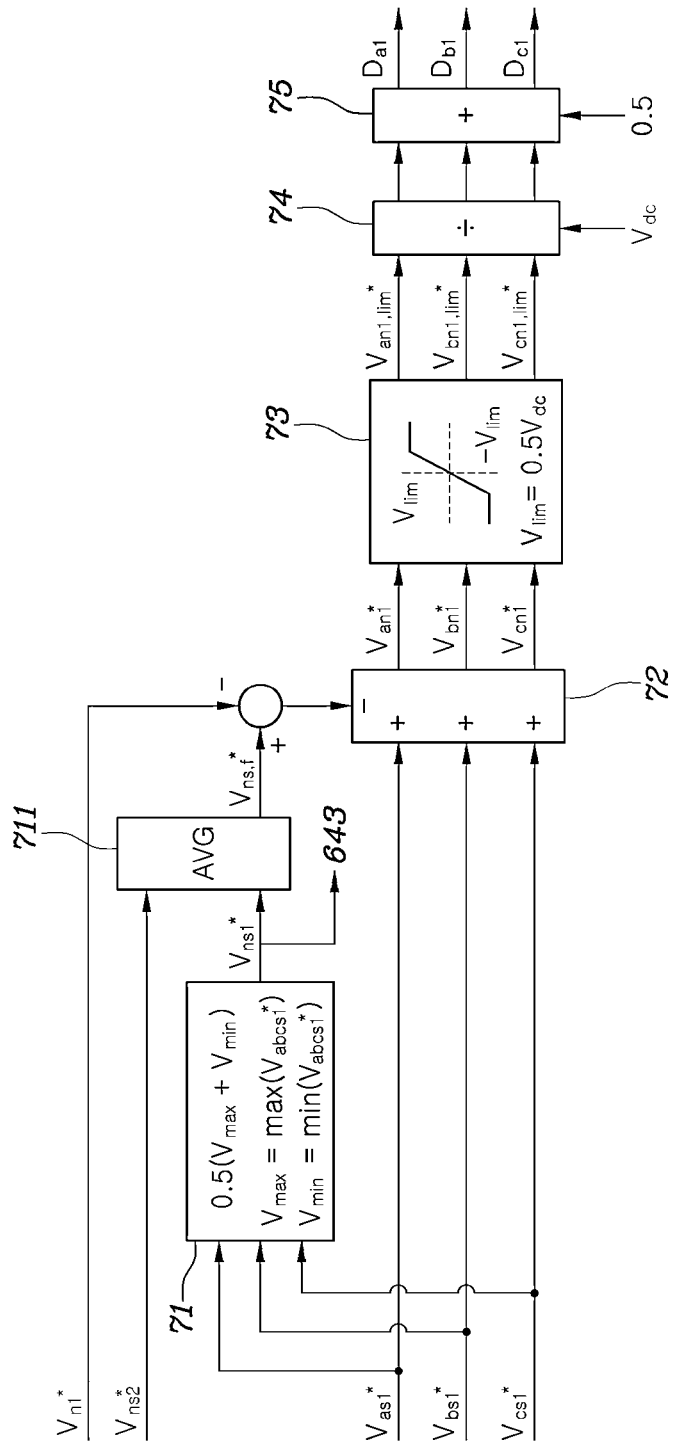
FIG. 7 is a block diagram illustrating in more detail a space vector modulation part in the controller applied to the motor drive device according to the exemplary embodiment of the present disclosure shown in FIG. 6.

FIG. 7 is a block diagram illustrating in more detail a space vector modulation part in the controller applied to the motor drive device according to the exemplary embodiment of the present disclosure. In particular, FIG. 7 illustrates in detail the first space vector pulse width modulation part 633 in the first duty generation part 63, and although not shown separately, the second space vector pulse width modulation part 643 in the second duty generation part 64 may also be implemented to have a configuration mutually corresponding thereto.

Referring to FIG. 7, the first space vector pulse width modulation part 633 in the first duty generation part 63 may include an offset voltage generation part 71, an offset voltage command synthesis part 711, a pole voltage command generation part 72, a pole voltage command limit part 73, a division part 74, and a summation part 75.

The offset voltage generating part 71 may generate an offset voltage command $V_{ns1*}$ based on the three-phase voltage commands $V_{as1*}$, $V_{bs1*}$, and $V_{cs1*}$ of the first inverter 10.

In the example shown in FIG. 7, the offset voltage generating part 71 is illustrated as to calculate the offset voltage command $V_{ns1*}$ of the first inverter 10 by an average of the maximum and minimum values of the three-phase voltage commands $V_{as1*}$, $V_{bs1*}$, and $V_{cs1*}$, but this is merely an example, and the offset voltage command may be determined in various ways known in the related art.

The offset voltage command synthesis part 711 may generate a synthesized offset voltage command $V_{ns,f*}$ by synthesizing the offset voltage command $V_{ns1*}$ of the first inverter 10 generated by the offset voltage generation part 71 and the offset voltage command $V_{ns2*}$ of the second inverter 20 generated by the second space vector pulse width modulation part 643 in the second duty generation part 64 with each other.

The offset voltage command synthesis part 711 may generate the synthesized offset voltage command $V_{ns,f*}$ in various ways. For example, the offset voltage command synthesis part 711 may add the offset voltage command $V_{ns1*}$ of the first inverter 10 and the offset voltage command $V_{ns2*}$ of the second inverter 20 after respectively applying weights to the offset voltage commands $V_{ns1*}$ and $V_{ns2*}$, and generate a synthesized offset voltage command $V_{ns,f*}$. In addition, the offset voltage command synthesis part 711 may determine the offset voltage command $V_{ns2*}$ by using an average value of the offset voltage command $V_{ns1*}$ of the first inverter 10 and the offset voltage command $V_{ns2*}$ of the second inverter 20.

No matter how the synthesis offset voltage command $V_{ns,f*}$ is generated by the offset voltage command synthesis part 711, the synthesized offset voltage commands $V_{ns,f*}$ respectively generated by the first space vector pulse width modulation part 633 and the second space vector pulse width modulation part 643 should be implemented to have the same value.

When the average value of the offset voltage command $V_{ns1*}$ of the first inverter 10 and the offset voltage command of the second inverter 20 is determined as the synthesized offset voltage command by the offset voltage command synthesis part 71, the zero phase component voltage output from each inverter is shown in Equation 3 below.

$$V_{ns1} = V_{n1*} - V_{ns,f*} = 0.5V_{n*} - 0.5*(V_{ns1*} + V_{ns2*})$$

$$V_{ns2} = V_{n2*} - V_{ns,f*} = -0.5V_{n*} - 0.5*(V_{ns1*} + V_{ns2*})$$ [Equation 3]

According to Equation 3, a difference $V_{ns1} - V_{ns2}$ between the zero phase component voltages of the two inverters may be output as the zero phase component voltage command $V_{n*}$ set in the current control part 62. Here, when the synthesized offset voltage command $V_{ns,f*}$ finally applied to the modulation of the two inverters is determined by the average of the two offset voltage commands $V_{ns1*}$ and $V_{ns2*}$, since the output duty margin of the two inverters becomes the same, it is preferable that the synthesized offset voltage command $V_{ns,f*}$ is determined by the average of the two offset voltage commands $V_{ns1*}$ and $V_{ns2*}$.

In FIG. 7, the pole voltage command generation part 72 may generate the pole voltage commands $V_{an1*}$, $V_{bn1*}$, and $V_{cn1*}$ of the first inverter 10 by subtracting a value, obtained by subtracting the zero phase component voltage command $V_{n1*}$ among the voltage commands of the first inverter 10 from the synthesized offset voltage command $V_{ns,f*}$, from each of the three-phase voltage commands $V_{as1*}$, $V_{bs1*}$, and $V_{cs1*}$ of the first inverter 10. In FIG. 7, the pole voltage command limit part 73 may limit the pole voltage commands to a range of $\pm 0.5$ of the DC voltage $V_{DC}$ applied to the first inverter 10 and the second inverter 20, the division part 74 may divide each limited pole voltage command by the DC voltage $V_{DC}$ applied to the first inverter 10 and the second inverter 20, and the summation part 75 may determine the duties $D_a$, $D_b$, and $D_c$ of the switching elements in the inverter by adding 0.5 to respective division results of the division part 74.

Since the techniques of the pole voltage command limit part 53, the division part 54, and the summation part 55 correspond to well-known techniques applied to implement the pulse width modulation control and the detailed operation can be sufficiently implemented by those skilled in the art, an additional detailed description thereof will be omitted.

In addition, although FIG. 7 illustrates a detailed configuration of the space vector pulse width modulation part 633 in the first duty generation part 63, those skilled in the art can easily infer a detailed configuration of the space vector pulse width modulation part 643 in the second duty generation part 64 through FIG. 7. Accordingly, a separate description of the space vector pulse width modulation part 643 in the second duty generation part 64 will be omitted.

Figure 8:
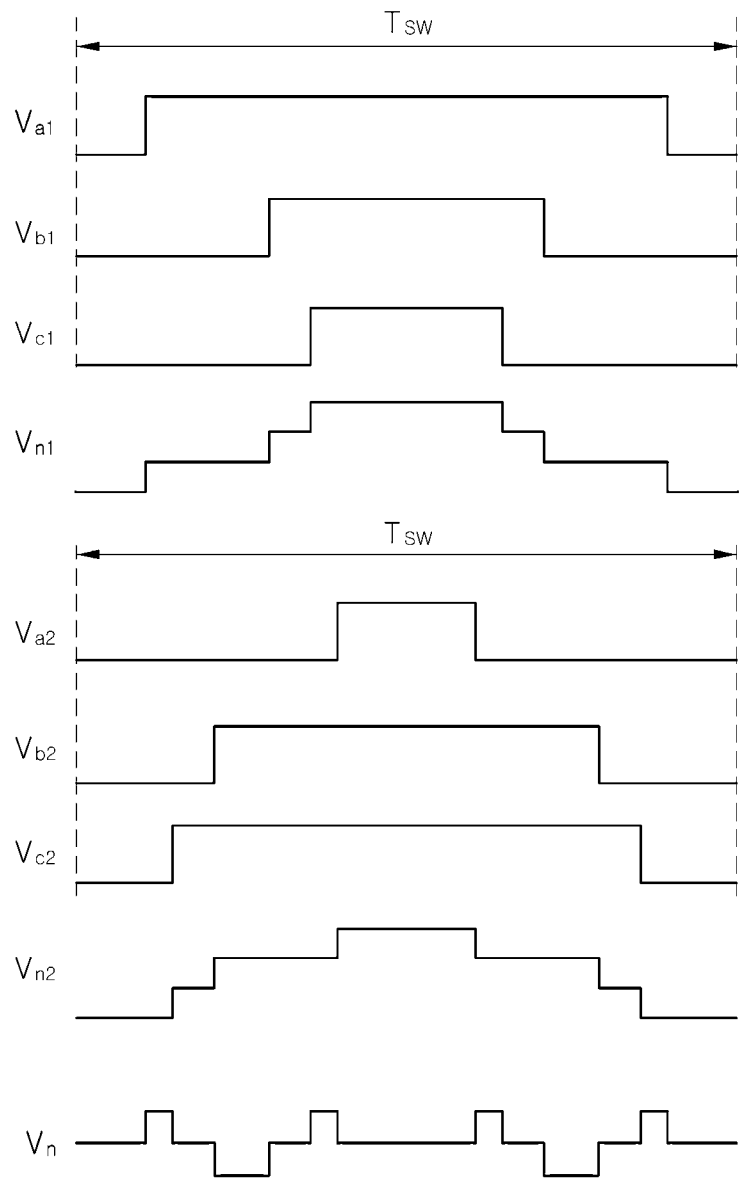
FIG. 8 is a waveform diagram illustrating voltage output of each inverter generated by control of the motor drive device according to the exemplary embodiment of the present disclosure shown in FIG. 6.

FIG. 8 is a waveform diagram illustrating voltage output of each inverter generated by the control of the motor drive device according to the exemplary embodiment of the present disclosure.

Referring to FIG. 8, when compared with the waveform of the conventional motor drive device shown in FIG. 4, it may be confirmed that the zero phase component voltage $V_n$ of a motor is determined to have an average value of zero within one period according to the motor drive device according to the exemplary embodiment of the present disclosure.

Therefore, in the motor drive device according to the exemplary embodiment of the present disclosure, desired control may be performed so that distortion of the zero phase component voltage is prevented from occurring by the space vector pulse width modulation, and accordingly, the common mode current generated in the motor may be suppressed, thereby suppressing unnecessary motor loss and preventing burnout damage of the motor.

The exemplary embodiment of the present disclosure shown in FIGS. 6 to 8 described above is the exemplary embodiment in which the average of the zero phase component voltages within the switching period is controlled to zero. In this exemplary embodiment, the zero phase component voltages may be controlled to zero with the average period, but a common mode current may be generated by instantaneously pulsating the zero phase component voltages, and the instantaneous common mode current may also cause loss of the motor. Hereinafter, another exemplary embodiment of the present disclosure in which even an instantaneous common mode current may be eliminated by suppressing the pulsation of the zero phase component voltages will be described.

Figure 9:
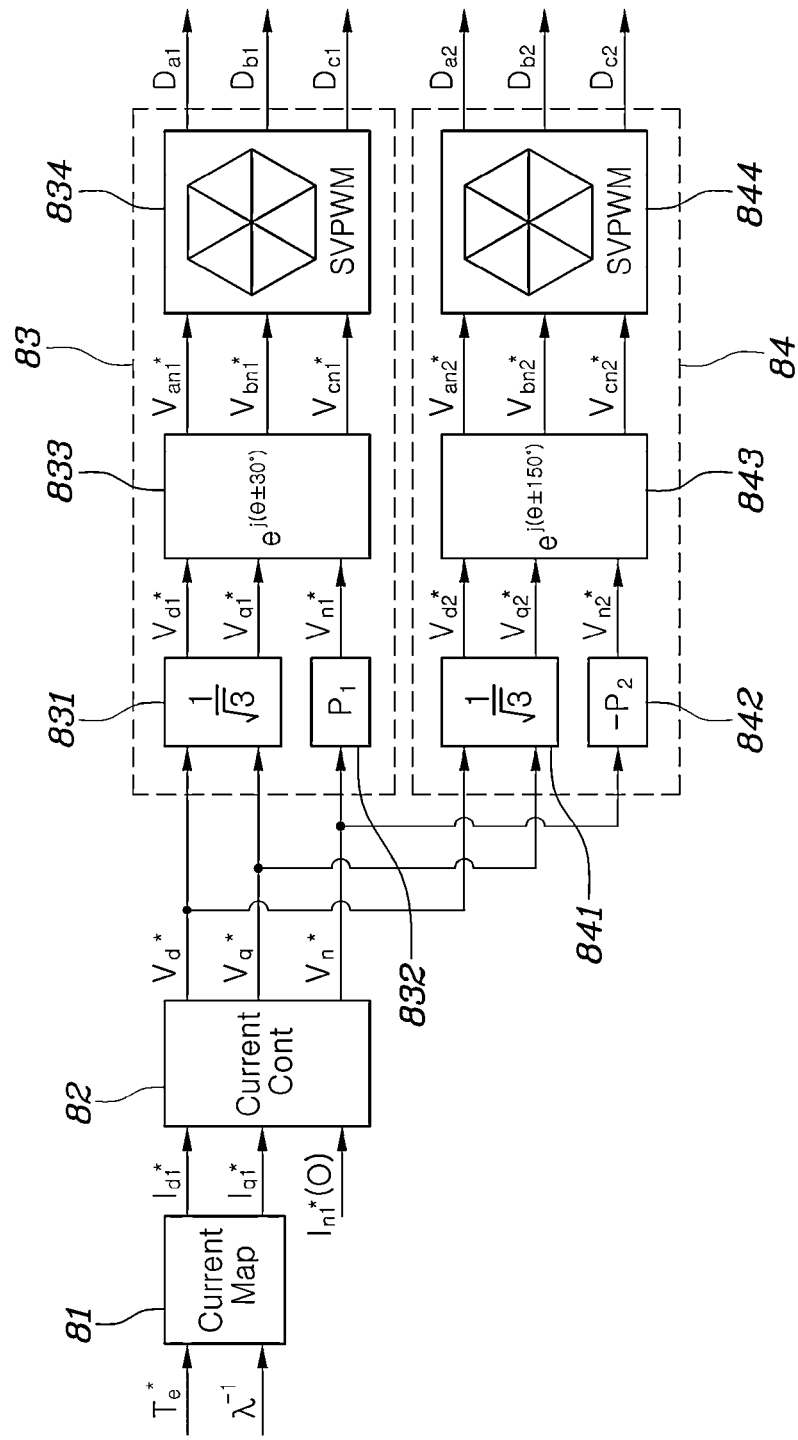
FIG. 9 is a block diagram illustrating in detail a controller applied to a motor drive device according to another exemplary embodiment of the present disclosure.

FIG. 9 is a block diagram illustrating in detail a controller applied to a motor drive device according to another exemplary embodiment of the present disclosure.

Referring to FIG. 9, the controller 30 of the motor drive device according to another exemplary embodiment of the present disclosure may include a current command map 81, a current controller 82, a first duty generation part 83, and a second duty generation part 84. According to an exemplary embodiment of the present disclosure, the controller 30 may include a processor (e.g., computer, microprocessor, CPU, ASIC, circuitry, logic circuits, etc.) and an associated non-transitory memory storing software instructions which, when executed by the processor, provides the functionalities of the current command map 81, the current controller 82, the first duty generation part 83, and the second duty generation part 84. Herein, the memory and the processor may be implemented as separate semiconductor circuits. Alternatively, the memory and the processor may be implemented as a single integrated semiconductor circuit. The processor may embody one or more processor(s).

The current command map 81 may be based on a motor demand output (i.e., a motor demand torque $T_{e*}$) and motor back electromotive force $\lambda^{-1}$, which are generated by an operator's operation and the like, and may generate current commands $I_{d*}$ and $I_{q*}$ corresponding to the motor demand output.

The current control part 62 may receive the current commands $I_{d*}$ and $I_{q*}$ and compare the same with the detected value of the current supplied to the actual motor, so that voltage commands $V_{d*}$, $V_{q*}$, and $V_{n*}$ capable of reducing the difference obtained by the comparison may be generated. The voltage command may include a d-axis component $V_{d*}$, a q-axis component $V_{q*}$, and a zero phase component $V_{n*}$.

The current command map 81 and the current controller 82 may be substantially the same as those applied to the conventional motor control technique illustrated in FIG. 2.

A first duty generation part 83 as an element for generating duties of switching elements in the first inverter 10 may include: a first multiplication part 831 configured to multiply, by $1/\sqrt{3}$, a d-axis voltage command $V_{d*}$ and a q-axis voltage command $V_{q*}$ among voltage commands $V_{d*}$, $V_{q*}$, and $V_{n*}$ to generate a first inverter d-axis voltage command $V_{d1*}$ and a first inverter q-axis voltage command $V_{q1*}$ to be applied to the first inverter 10; a second multiplication part 832 configured to multiply, by $P_1$, a zero-phase component voltage command among the voltage commands $V_{d*}$, $V_{q*}$, and $V_{n*}$ to generate a first inverter zero-phase component voltage command $V_{n1*}$; a coordinate conversion part 833 configured to respectively convert the first inverter voltage commands $V_{d1*}$, $V_{q1*}$, and $V_{n1*}$ into first inverter phase voltage commands $V_{as1*}$, $V_{bs1*}$, and $V_{cs1*}$ corresponding to respective phases of a motor and convert the first inverter voltage commands $V_{d1*}$, $V_{q1*}$, and $V_{n1*}$ to respectively precede or follow a rotation angle θ of the motor by 30 degrees; and a first space vector pulse width modulation part 834 configured to perform space vector pulse width modulation based on the first inverter phase voltage commands $V_{as1*}$, $V_{bs1*}$, and $V_{cs1*}$ to generate duties $D_{a1}$, $D_{b1}$, and $D_{c1}$ of the respective switching elements in the first inverter 10.

A second duty generation part 84 as an element for generating duties of switching elements in the second inverter 20 may include: a third multiplication part 841 configured to multiply, by $1/\sqrt{3}$, a d-axis voltage command $V_{d*}$ and a q-axis voltage command $V_{q*}$ among voltage commands $V_{d*}$, $V_{q*}$, and $V_{n*}$ to a second inverter d-axis voltage command $V_{d2*}$ and a second inverter q-axis voltage command $V_{q2*}$ to be applied to the second inverter 20; a fourth multiplication part 842 configured to multiply, by $-P_1$ (here, $P_1+P_2=1$), a zero-phase component voltage command among the voltage commands $V_{d*}$, $V_{q*}$, and $V_{n*}$ to generate a second inverter zero-phase component voltage command $V_{n2*}$; a coordinate conversion part 843 configured to respectively convert the second inverter voltage commands $V_{d2*}$, $V_{q2*}$, and $V_{n2*}$ into second inverter phase voltage commands $V_{as2*}$, $V_{bs2*}$, and $V_{cs2*}$ corresponding to the respective phases of the motor and convert the second inverter voltage commands $V_{d2*}$, $V_{q2*}$, and $V_{n2*}$ to respectively precede or follow the rotation angle θ of the motor by 150 degrees; and a second space vector pulse width modulation part 844 configured to perform the space vector pulse width modulation based on the second inverter phase voltage commands $V_{as2*}$, $V_{bs2*}$, and $V_{cs2*}$ to generate duties $D_{a2}$, $D_{b2}$, and $D_{c2}$ of the respective switching elements in the second inverter 20.

Here, it is known in the related art that the rotation angle θ of the motor may be obtained from a rotation angle sensor (not shown) installed in the motor.

In the exemplary embodiment of the present disclosure, it is characterized in that the first duty generating part 83 and the second duty generating part 84 perform the coordinate conversion so as to have a difference of 120 degrees apart from each other in the process of converting the d-axis voltage command and the q-axis voltage command into a three-phase voltage command.

Figure 10:
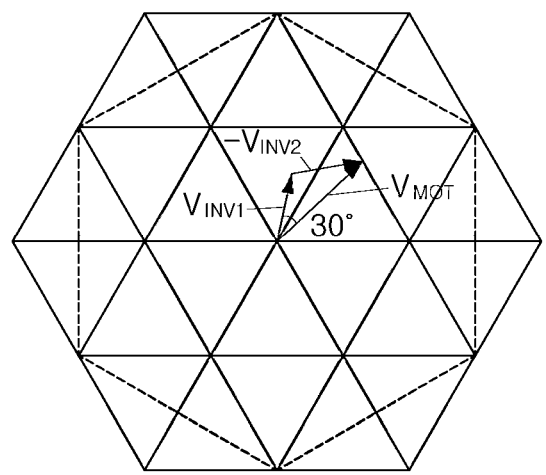
FIG. 10 is a voltage vector diagram for describing an example in which a phase voltage command of a first inverter is converted to precede a rotation angle of the motor by 30 degrees and a phase voltage command of a second inverter is converted to precede the rotation angle of the motor by 150 degrees in the exemplary embodiment of the present disclosure shown in FIG. 9.
Figure 10:
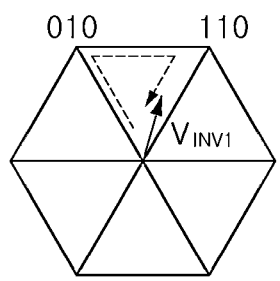
Figure 10:
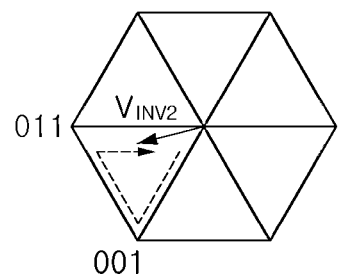
Figure 11:
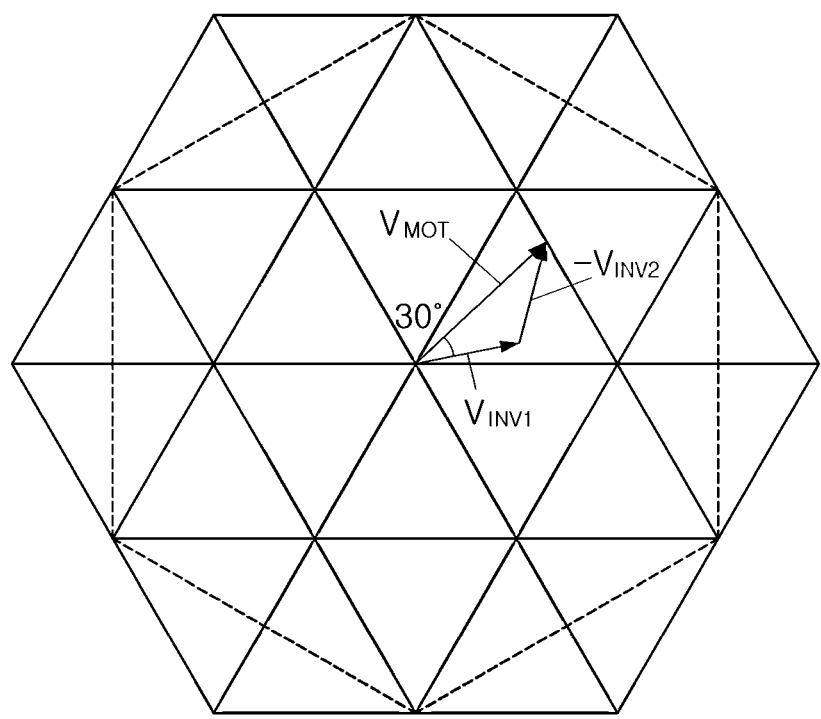
FIG. 11 is a voltage vector diagram for describing an example in which the phase voltage command of the first inverter is converted to follow the rotation angle of the motor by 30 degrees and the phase voltage command of the second inverter is converted to follow the rotation angle of the motor by 150 degrees in the exemplary embodiment of the present disclosure shown in FIG. 9.

FIG. 10 is a voltage vector diagram for describing an example in which a phase voltage command of the first inverter 10 is converted to precede the rotation angle of the motor by 30 degrees and a phase voltage command of the second inverter 20 is converted to precede the rotation angle of the motor by 150 degrees in the exemplary embodiment of the present disclosure shown in FIG. 9. FIG. 11 is a voltage vector diagram for describing an example in which the phase voltage command of the first inverter 10 is converted to follow the rotation angle of the motor by 30 degrees and the phase voltage command of the second inverter 20 is converted to follow the rotation angle of the motor by 150 degrees in the exemplary embodiment of the present disclosure shown in FIG. 9. Naturally, it is also possible to set the phase voltage command of the first inverter 10 to precede or follow 150 degrees and to set the phase voltage command of the second inverter 20 to precede or follow 30 degrees.

As shown in FIG. 10, the motor voltage $V_{MOT}$ may be expressed as a difference between the first inverter voltage $V_{INV1}$ and the second inverter voltage $V_{INV2}$. In more detail, in a case where a first inverter voltage $V_{INV1}$ precedes a motor voltage $V_{MOT}$ by 30 degrees and has a magnitude of $1/\sqrt{3}$ times the motor voltage and a second inverter voltage $V_{INV2}$ precedes the motor voltage $V_{MOT}$ by 150 degrees and has a magnitude of $1/\sqrt{3}$ times the motor voltage, it can be confirmed that the difference between the first inverter voltage and the second inverter voltage is generated as the motor voltage.

Similar to the case, as shown in FIG. 11, in a case where the first inverter voltage $V_{INV1}$ follows the motor voltage $V_{MOT}$ by 30 degrees and has a magnitude of $1/\sqrt{3}$ times the motor voltage and the second inverter voltage $V_{INV2}$ follows the motor voltage $V_{MOT}$ by 150 degrees and has a magnitude of $1/\sqrt{3}$ times the motor voltage, it can be confirmed that the difference between the first inverter voltage and the second inverter voltage is generated as the motor voltage.

Figure 12:
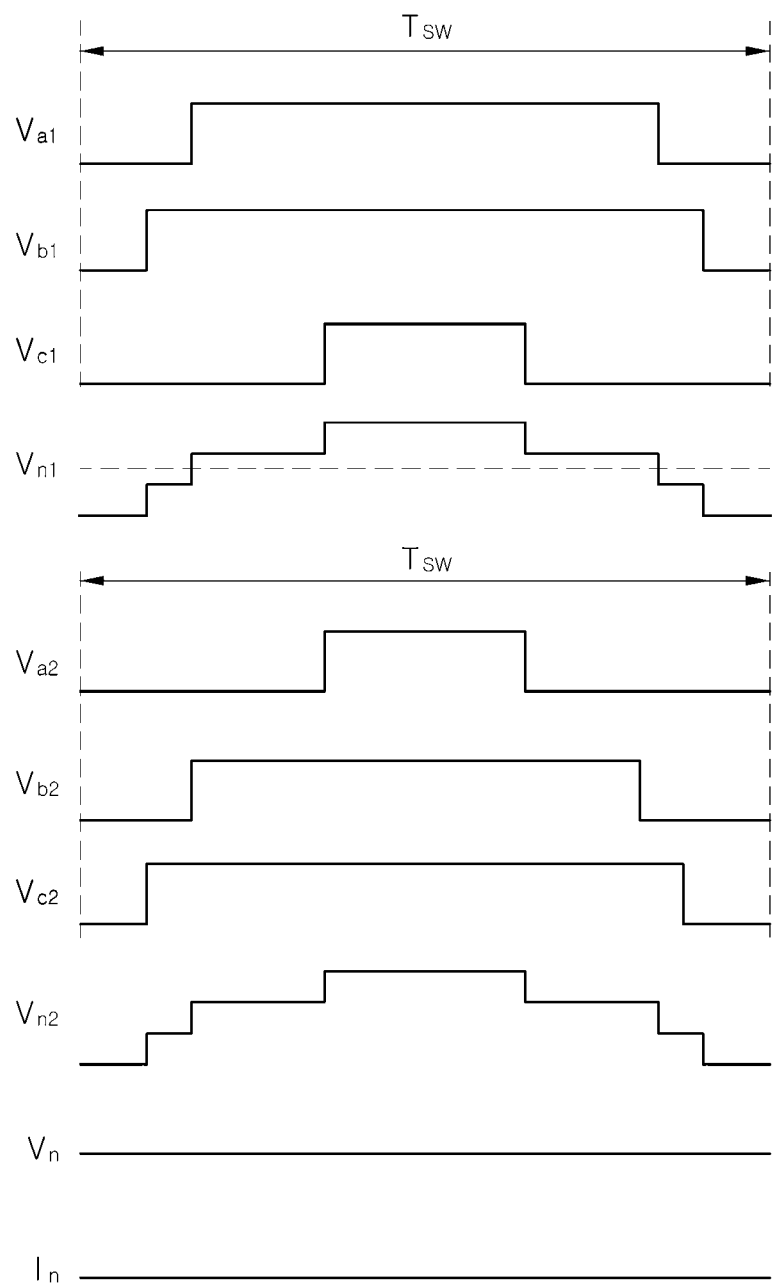
FIG. 12 is a waveform diagram illustrating the voltage output of each inverter, a zero phase voltage component, and a common mode current, which are generated by the control of the motor drive device according to the exemplary embodiment of the present disclosure shown in FIG. 9.

FIG. 12 is a waveform diagram illustrating voltage output of each inverter, a zero phase voltage component, and a common mode current, which are generated by the control of the motor drive device according to the exemplary embodiment of the present disclosure shown in FIG. 9.

As shown in FIG. 12, when the voltage vectors output by the two inverters have a difference of 120 degrees, it can be confirmed that the same zero phase component voltages $V_{n1}$ and $V_{n2}$ are instantaneously generated when the modulation using the two voltage vectors is performed. Therefore, a difference $V_n$ between the zero phase component voltages of the two inverters becomes zero instantaneously, and accordingly, it can be confirmed that the zero phase component current ripple (i.e., common mode current) due to the difference between the zero phase component voltages also becomes zero.

Meanwhile, in the exemplary embodiment of the present disclosure, the zero phase component voltage command $V_{n*}$ for each inverter may be distributed differently. That is, in FIG. 9, a multiple value $P_1$ for the first inverter 10 and a multiple value $P_2$ for the second inverter 20 respectively set by a second multiplication part 832 and a fourth multiplication part 842 may be determined to have different magnitudes. Here, the sum of the magnitudes of the two multiple values should be 1 (i.e., $P_1+P_2=1$).

Since the distribution of the zero phase voltage command $V_{n*}$ does not affect the motor output, the distribution is the same for the motor.

As an example, in a case of equally dividing the magnitude of the zero phase component voltage (i.e., when the magnitudes of $P_1$ and $P_2$ are the same), due to the errors, such as switching dead time, present in the inverter and the compensation therefor, the final output duties of the two inverters may be different from each other, whereby a case where one inverter is subjected to a duty limit first may occur.

Whereas, when the two inverters are given a degree of freedom for the distribution of the zero phase component voltage command, a means capable of equally adjusting the maximum value of the duties, which differs from each other due to the errors such as dead time present in the inverter, may be provided, and in this way, the motor output may be improved. That is, through the tuning of the multiple values $P_1$ and $P_2$, it is possible to appropriately solve the problems caused by the errors that the inverter itself inevitably has, and in this way, the motor output may be improved.

Although the above has been shown and described in relation to specific exemplary embodiments of the present disclosure, those skilled in the art will appreciate that the present disclosure can be variously improved and changed without departing from the scope of the claims.

What is claimed is:

1. A motor drive device configured to drive a motor having a plurality of windings respectively corresponding to a plurality of phases, the motor drive device comprising:
a first inverter including a plurality of first switching elements, and connected to a first end of each of the plurality of windings;
a second inverter including a plurality of second switching elements, and connected to a second end of each of the plurality of windings; and
a controller configured to generate phase voltage commands of the first inverter and phase voltage commands of the second inverter based on preset voltage commands of the motor, wherein the phase voltage commands of the first inverter and the phase voltage commands of the second inverter are respectively represented as vectors of different angles,
wherein the first inverter and the second inverter convert DC power stored in a battery into AC power and provide the AC power to the motor.

2. The motor drive device of claim 1, wherein the controller generates the phase voltage commands of the first inverter and the phase voltage commands of the second inverter based on the voltage commands of the motor, wherein the phase voltage commands of the first inverter and the phase voltage commands of the second inverter respectively become vectors each having a same magnitude and a difference of 120 angle degrees apart from each other.

3. The motor drive device of claim 2, wherein the controller comprises:
a current command map configured to generate current commands based on preset demand output of the motor;
a current control part configured to compare the generated current commands with a detected value of a current supplied to the motor and to generate voltage commands of the motor in order to reduce a difference obtained by the comparison;
a first duty generation part configured to generate voltage commands of the first inverter by multiplying each of the voltage commands of the motor by $1/\sqrt{3}$, and to respectively convert the voltage commands of the first inverter into the phase voltage commands of the first inverter; and
a second duty generation part configured to generate voltage commands of the second inverter from the voltage commands of the motor, and to respectively convert the voltage commands of the second inverter into the phase voltage commands of the second inverter.

4. The motor drive device of claim 3, wherein the first duty generation part generates a d-axis component voltage command and a q-axis component voltage command of the first inverter by multiplying the d-axis component voltage command and the q-axis component voltage command among the voltage commands of the motor by $1/\sqrt{3}$, and
the second duty generation part generates a d-axis component voltage command and a q-axis component voltage command of the second inverter from the d-axis component voltage command and the q-axis component voltage command among the voltage commands of the motor.

5. The motor drive device of claim 3, wherein the first duty generation part generates the phase voltage commands of the first inverter by converting the voltage commands of the first inverter to precede a rotation angle of the motor by 30 degrees, and
the second duty generation part generates the phase voltage commands of the second inverter by converting the voltage commands of the second inverter to precede the rotation angle of the motor by 150 degrees.

6. The motor drive device of claim 3, wherein the first duty generation part generates the phase voltage commands of the first inverter by converting the voltage commands of the first inverter to follow a rotation angle of the motor by 30 degrees, and the second duty generation part generates the phase voltage commands of the second inverter by converting the voltage commands of the second inverter to follow the rotation angle of the motor by 150 degrees.

7. The motor drive device of claim 3, wherein the first duty generation part generates the phase voltage commands of the first inverter by converting the voltage commands of the first inverter to precede a rotation angle of the motor by 150 degrees, and the second duty generation part generates the phase voltage commands of the second inverter by converting the voltage commands of the second inverter to precede the rotation angle of the motor by 30 degrees.

8. The motor drive device of claim 3, wherein the first duty generation part generates the phase voltage commands of the first inverter by converting the voltage commands of the first inverter to follow a rotation angle of the motor by 150 degrees, and the second duty generation part generates the phase voltage commands of the second inverter by converting the voltage commands of the second inverter to follow the rotation angle of the motor by 30 degrees.

9. The motor drive device of claim 3, wherein the first duty generation part generates zero phase component voltage commands of the first inverter by multiplying the zero phase component voltage commands among the voltage commands of the motor by $P_1$, and the second duty generation part generates zero phase component voltage commands of the second inverter by multiplying the zero phase component voltage commands among the voltage commands of the motor by $-P_2$, wherein $P_1+P_2=1$.

10. The motor drive device of claim 9, wherein the $P_1$ and $P_2$ respectively have values different from each other.

* * * * *